United States Patent [19]

Manino

[11] Patent Number: 4,911,667
[45] Date of Patent: Mar. 27, 1990

[54] PROCESS FOR RECONDITIONING CATHODE RAY TUBES

[75] Inventor: Alfred R. Manino, Seneca Falls, N.Y.

[73] Assignee: North American Philips Consumer Electronics Corp., New York, N.Y.

[21] Appl. No.: 805,650

[22] Filed: Dec. 6, 1985

[51] Int. Cl.⁴ .............................................. H01J 9/20
[52] U.S. Cl. .......................................... 445/5; 445/6
[58] Field of Search ..................... 445/5, 6, 17, 18, 20

[56] References Cited

U.S. PATENT DOCUMENTS

| | | |
|---|---|---|
| 3,736,038 | 5/1973 | Nakanishi ................................ 445/5 |
| 4,052,776 | 10/1977 | Maskell .................................. 445/5 |
| 4,214,798 | 7/1980 | Hopen ..................................... 445/5 |
| 4,395,242 | 7/1983 | Liller ...................................... 445/5 |
| 4,515,569 | 5/1985 | Hernquist ............................... 445/5 |

Primary Examiner—Kurt Rowan
Attorney, Agent, or Firm—John C. Fox

[57] ABSTRACT

Mini neck tubes rejected for lower gap leakage are reconditioned by connecting together the cathodes, grounding the G3 electrode and applying a high voltage pulse to the G2 electrode using a hand-held sparking coil.

6 Claims, 2 Drawing Sheets

PROCESS FOR RECONDITIONING CATHODE RAY TUBES

BACKGROUND OF THE INVENTION

This invention relates to the high voltage processing of color cathode ray tubes (CRTs), and more particularly relates to the reconditioning of the lower gap of mini-neck color CRTs.

In the manufacture of CRTs for color television, it is necessary to process the electron gun assembly (also called the "mount") after it has been sealed into the neck of the CRT, in order to minimize the occurrence of internal arcs during later CRT operation. Modern color CRTs are particularly susceptible to such internal arcing due to their relatively high operating potentials (e.g., 25 KV and higher), and complex electron gun structures having relatively small interelectrodes spacings (e.g., mils).

In high voltage processing (also called "conditioning" or "spot" knocking), internal arcing between electrodes is purposely induced to remove microscopic sources of field emission such as foreign particles and interelectrode projections, which could otherwise lead to detrimental arcing during later tube operation.

To be effective, such conditioning should induce arcing not only in the upper gap (gap between the final focusing electrode and the final accelerating electrode), but also in the lower gap (gap between the focusing electrode and the final grid electrode).

Various arrangements have been proposed for the high voltage conditioning of color CRTs. See, for example, U.S. Pat. Nos. 3,736,038; 4,052,776; 4,214,798; and 4,326,762.

Recently, several CRT manufacturers have begun to produce tubes having smaller diameter necks, so-called mini neck tubes. These tubes offer cost saving advantages to the TV set manufacturer and end user, such as smaller electron beam deflection yokes and lower power consumption.

Of course, the smaller size of the mini neck (22 mm diameter versus 29 mm diameter for the older narrow neck types) requires a smaller mount. Unfortunately, the smaller size and consequent smaller interelectrode spacings of the mini neck mounts as compared to the older narrow neck mounts leads to a greater susceptibility to arcing. Thus, the need for effective high voltage conditioning is especially critical for these mini neck mounts.

An arrangement which has been found to be particularly effective for both upper and lower gap conditioning of the newer mini neck types of CRTs is described and claimed in U.S. patent application Ser. No. 713,939, filed Mar. 20, 1985.

Despite the effective conditioning which each CRT undergoes, a small number of tubes still exhibit an unstable condition during a procedure called set-up, which is performed by the customer. One part of the set-up procedure is the setting of cut-off voltages on the mount components. Cut-off is simply the voltage value at which electron emission becomes zero. This condition is approached when the screen raster collapses to a horizontal line, and is indicated when the line disappears from the screen.

The unstable condition which occurs during setting of the cut-off voltages is a flickering of the horizontal line on the screen, making it difficult to determine the exact point of cut-off. This flickering is caused by a low level field emission from the G2 grid electrode, probably from the edges or surface of the electrode, at low work function sites. These sites are thought to be comprised of surface contaminants or irregularities such as projections.

It is an object of the invention to provide a method for eliminating this field emission from the G2 grid electrode.

It is another object of the invention to provide such a method which is simple and does not require the set-up and use of elaborate equipment.

SUMMARY OF THE INVENTION

In accordance with the invention, low level field emissions from the G2 grid of color CRTs during the setting of cut-off voltage are substantially completely eliminated by a lower gap reconditioning process comprising the following steps:

(a) grounding the G3 focusing electrode;

(b) interconnecting the cathode heaters and allowing them to float electrically; and (c) briefly applying a radio frequency, high voltage pulse to the G2 grid electrode.

In accordance with a preferred embodiment of the invention, the pulse to the G2 electrode is applied by contacting a lead from the electrode with the output from a hand sparker containing a Tesla coil.

DESCRIPTION OF THE PREFERRED EMBODIMENT

Figure 1:
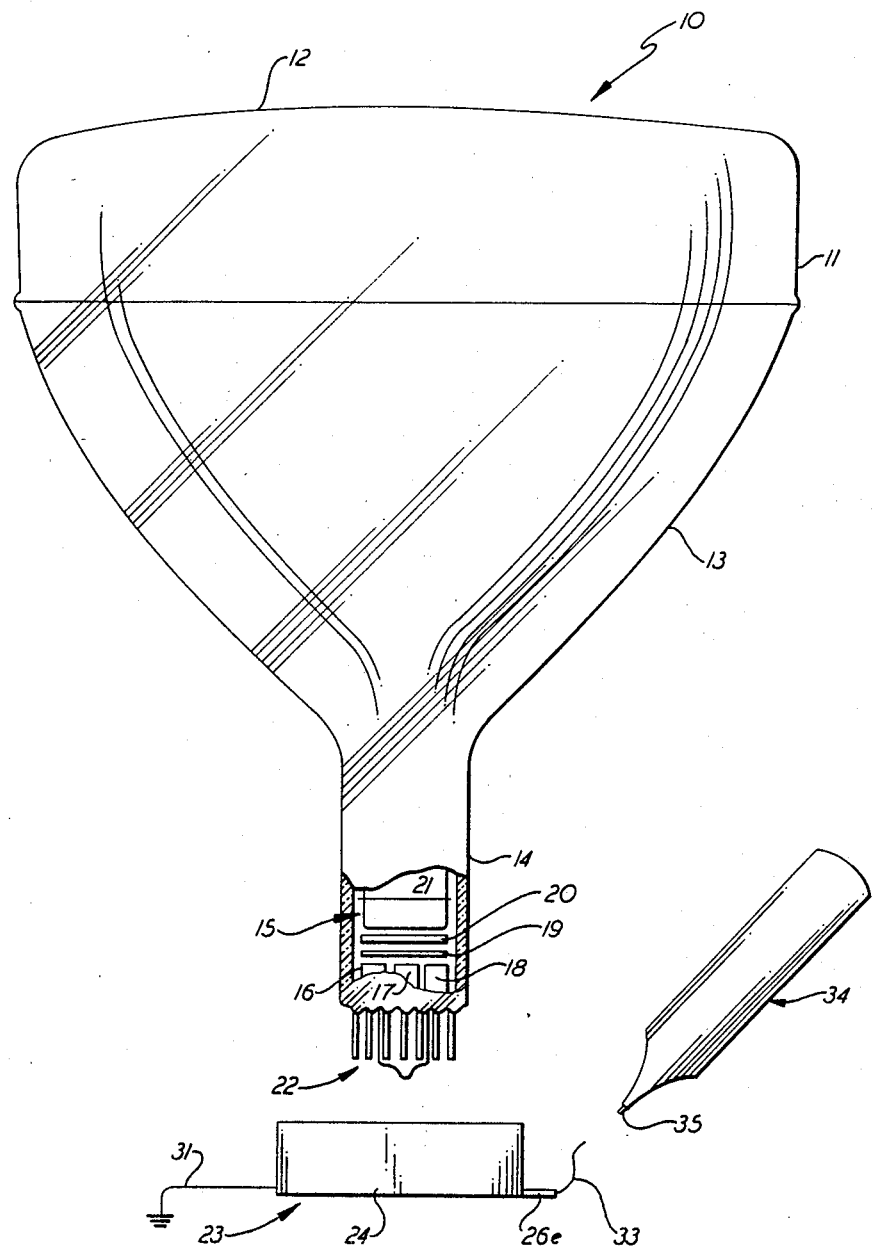
FIG. 1 is a front view of a color CRT in a socket, partly cut away, and a hand-held sparker applying a spark to a lead from the socket.

Referring now to FIG. 1, color CRT 10 has glass envelope 11 comprised of face panel 12, funnel 13 and neck 14 portions. In the neck 14 is located the electron gun or mount 15, having three in-line cathodes 16, 17 and 18, and several electrodes, only the first three of which are shown. These are the G1 and G2 grid electrodes 19 and 20, respectively, and the G3 focusing electrode 21.

Figure 4:
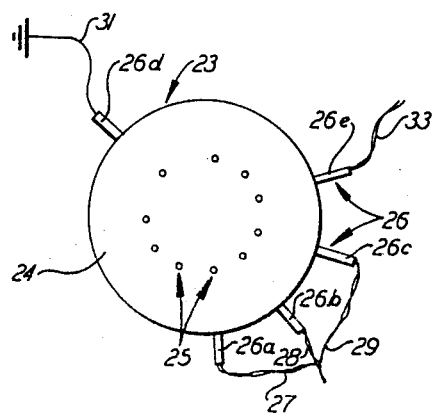

Extending from the bottom portion of the neck 14 is a plurality of base pins 22, for providing external electrical connection to the cathodes and electrodes of the mount 15. Immediately adjacent to these pins 22 is pin socket 23. As shown in FIG. 4, socket 23 has an insulating body 24 containing a plurality of female connectors 25 corresponding to base pins 22, and a plurality of terminals 26 attached to body 24 and electrically connected to connectors 25.

Socket 23 provides a convenient means for making the electrical connections necessary to carry out the reconditioning process. It also provides some measure of protection against arc-over between base pins 22 by virtue of the insulating body filling the space between the base pin female connectors 25.

Extending from the cathode heater terminals 26a, b and c are leads 27, 28 and 29, which are connected together. Extending from the G3 terminal 26d is grounding lead 31, and extending from G2 terminal 26e is lead 33.

Also shown in FIG. 1 is hand-held sparker 34, having a spark gap 35, and containing a spark generating Tesla coil, not shown. In the practice of the invention, the socket 23 is inserted onto the base pins 22, the G3 lead is grounded, and the G2 lead is briefly contacted with the sparker 34 in order to generate arcing within the mount 15 at any low work function sites, such as impurities or projections on the mount parts. Typically, up to only a few seconds are required, i.e., up to two to four seconds, in order to remove these sources of unwanted field emission.

The output of the hand sparker is a radio frequency pulse, typically having a frequency of about ten to one thousand cycles per second, and the voltage of the pulses typically rise to a peak of about 20 to 30 kilovolts.

Figure 2:
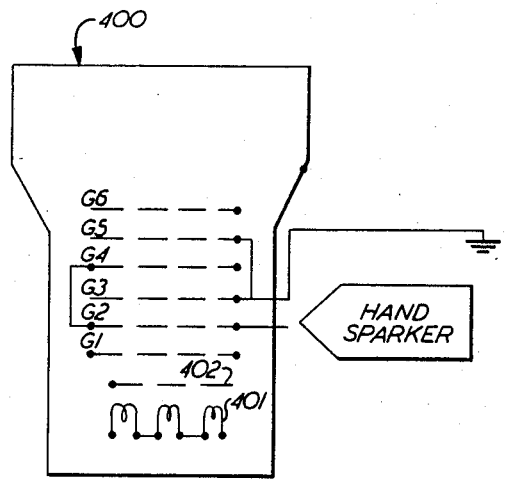
FIG. 2 is a schematic diagram of a mini neck color CRT showing the arrangement for reconditioning the lower gap of the mount.

FIG. 2 shows the arrangement for reconditioning of the mount parts of a mini-neck tube 400 in schematic form. The various elements of the mount include cathodes 402, including heaters 401, and six electrodes, designated G1 through G6, respectively. In this mount, the G2 and G4 grids are prefocusing electrodes which are interconnected and are thus maintained at a common potential during CRT operation, while G3 and G5 are focusing electrodes which are also interconnected and at a common (higher) potential during operation.

As shown in FIG. 2, for reconditioning, the cathode heaters 402 are interconnected and allowed to "float", i.e., they are neither grounded nor raised above ground potential. The G3 electrode is grounded, and the G2 electrode is sparked, in the manner already described. The remaining electrodes are allowed to float.

The reconditioning process has been described for use on mount types having more than one focusing electrode, such as the mini-neck mount or the so-called "TPF" mount. However, it is also effective in treating other types of mounts, such as those having only one focusing electrode, for example, the so-called "HiBi" and "LoBi" mounts.

Figure 3:
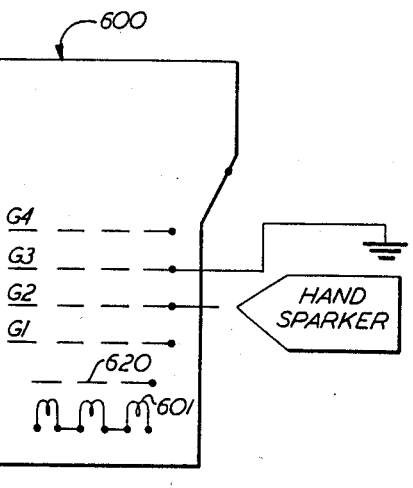
FIG. 3 is a schematic diagram of a color CRT showing the arrangement for reconditioning the lower gap of a different type of mount from that shown in FIG. 2.

Such a mount is shown schematically in tube 600 of FIG. 3, in which cathode heaters 601 are interconnected and allowed to float, the G3 electrode is grounded and the G2 electrode is sparked. As in the FIG. 2 arrangement, the remaining electrodes are allowed to float.

After the reconditioning process has been completed, the tube can be inserted into a test socket for inducing field emissions from the G2 electrode by simulating the operating conditions of the tube. If any field emissions are detected, the reconditioning process may be repeated.

The process of the invention has been used to successfully recondition color CRT tube types having focusing electrodes operating at potentials of up to about 12 kilovolts. By way of example, a group of 16 mini-neck tubes, having focusing electrode operating voltages of about 9 KV which had been rejected for lower gap leakages ranging from about 2 to 15 microamps, were reconditioned according to the invention. After reconditioning, only one tube continued to show such leakage, at a level of about 2 microamps.

I claim:

1. Process for reconditioning the lower gap of a color cathode ray tube comprising:
    (a) grounding the G3 focusing electrode;
    (b) interconnecting the cathode heaters and allowing them to float electrically; and
    (c) briefly applying a radio frequency, high voltage pulse to the G2 grid electrode.

2. The process of claim 1 in which the pulse is characterized by a frequency within the range of about 10 to 100 cycles per second, and a peak voltage within the range of about 20 to 30 kilovolts.

3. The process of claim 1 in which the pulse is applied for a time of up to about 2 seconds.

4. The process of claim 3 in which the pulse is applied for a time of up to about 4 seconds.

5. The process of claim 1 in which the pulse is applied by contacting a lead from the G2 electrode with the output from a hand-held sparker containing a Tesla coil.

6. The process of claim 5 in which the tube is inserted into a socket having an insulating body and terminals corresponding to at least the cathode heaters, the G2 grid electrode and the G3 focusing electrode; the terminals corresponding to the cathode heaters are interconnected; the terminal corresponding to the G3 focusing electrode is grounded; and the output of the sparker is applied to the terminal corresponding to the G2 electrode.

* * * * *